R. P. WRIGHT & F. W. HUBBARD.
MACHINE FOR FORMING SCREW THREAD CUTTING DEVICES.
APPLICATION FILED FEB. 20, 1908.
1,033,142.
Patented July 23, 1912.
2 SHEETS—SHEET 1.
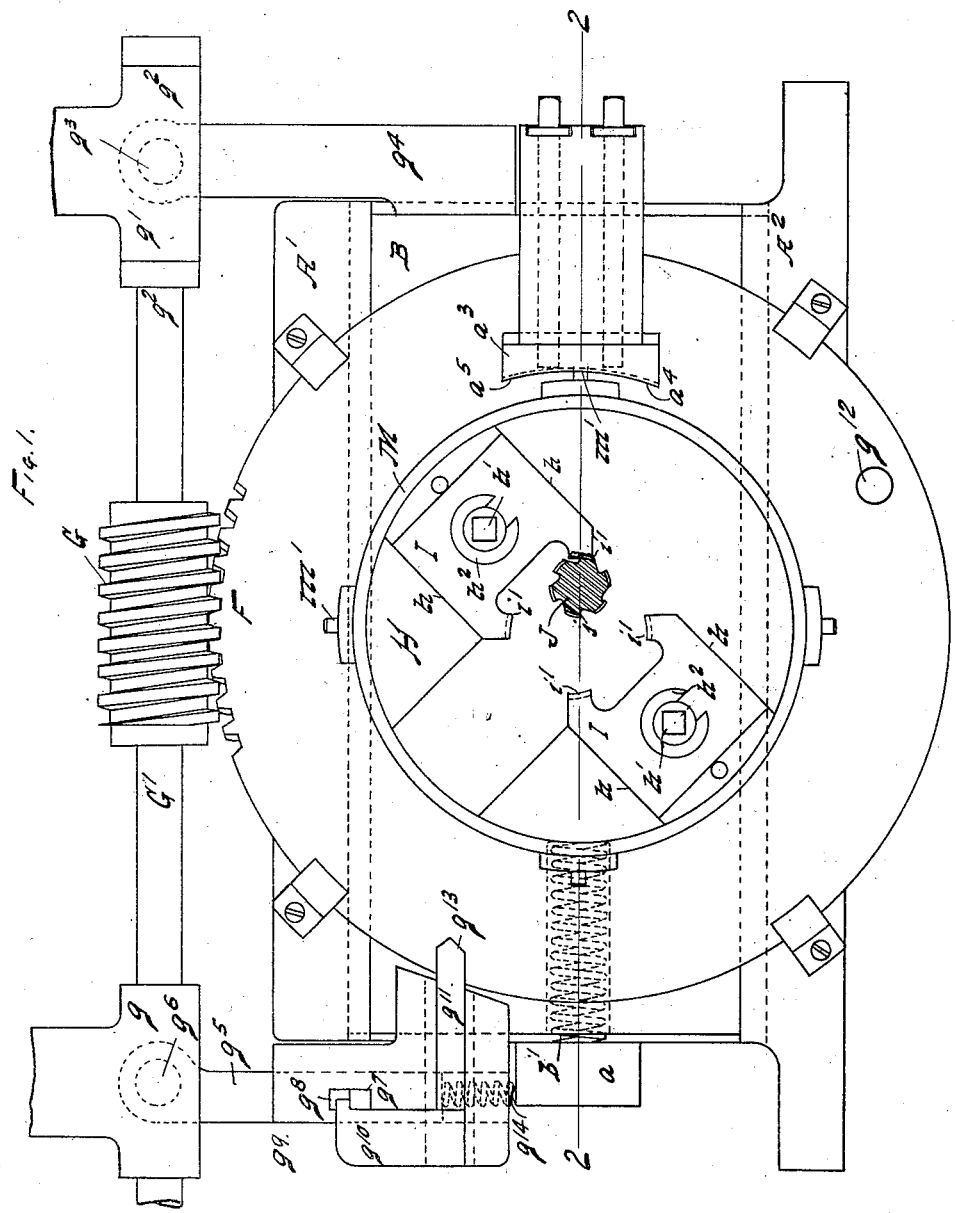

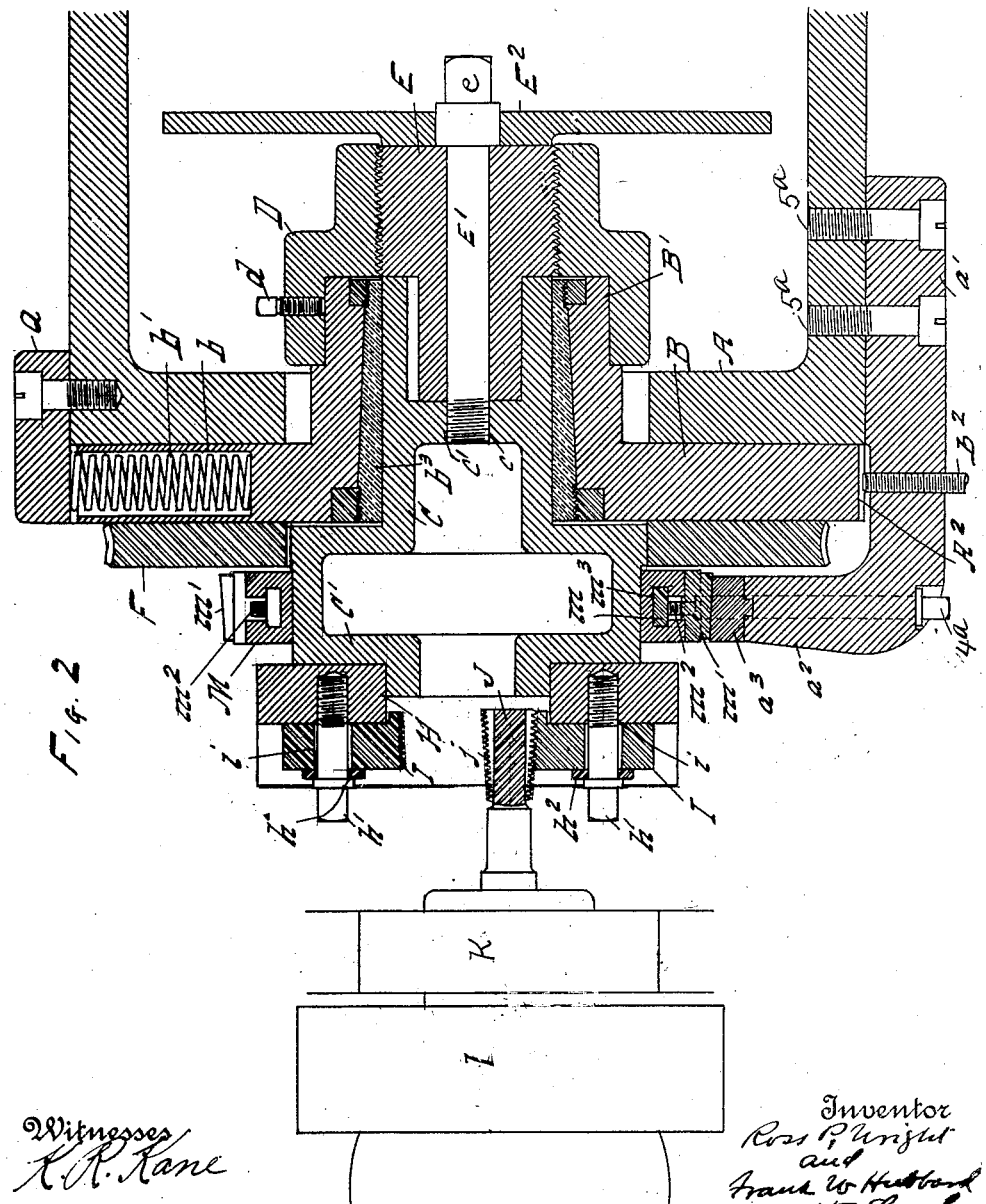

UNITED STATES PATENT OFFICE.

ROSS PIER WRIGHT AND FRANK W. HUBBARD, OF ERIE, PENNSYLVANIA, ASSIGNORS TO REED MANUFACTURING COMPANY, OF ERIE, PENNSYLVANIA, A CORPORATION OF PENNSYLVANIA.

MACHINE FOR FORMING SCREW-THREAD-CUTTING DEVICES.

1,033,142. Specification of Letters Patent. Patented July 23, 1912.

Continuation of application Serial No. 293,615, filed December 28, 1905. This application filed February 20, 1908. Serial No. 416,814.

*To all whom it may concern:*

Be it known that we, Ross PIER WRIGHT and FRANK W. HUBBARD, citizens of the United States, residing at Erie, in the county of Erie and State of Pennsylvania, have invented new and useful Improvements in Machines for Forming Screw-Thread-Cutting Devices, of which the following is a specification.

This invention relates to machines for forming screw thread cutting devices and consists in certain improvements in the construction thereof as will be hereinafter fully described and pointed out in the claims.

This is a continuation of application No. 293,615, filed December 28, 1905.

The machine is peculiarly adapted for forming screw cutting dies. Heretofore such dies have been formed by the application of an ordinary cutting tool or hob, and such dies have also been formed by a milling cutter having a single line of teeth forming one groove between the thread with each operation. With this single milling cutter the process is slower than where the ordinary hob is directly applied to the work. We have discovered that a milling cutter forming simultaneously a plurality of threads may be used for forming such devices and in the preferred construction the axis of the milling cutter is parallel to the axis of the device that is being cut. With such a cutter these devices may be quickly formed and the finish is much better than that formed with a hob.

The invention is illustrated in the accompanying drawings as follows:—

Figure 1 is a side elevation of the head for carrying the device. Fig. 2 is a section on the line 2—2 in Fig. 1.

A marks the frame of the machine. Slidingly mounted in the cross pieces A' and A² is the head carrying plate B. This head carrying plate has the bearing formed by the bushing $b^3$ and in this bearing is journaled the arbor C, carrying the head C'. The head carrying plate B has the spring slot $b$ in which is arranged a spring $b'$ and block $a$ is secured to the frame A and forms a base against which the spring $b'$ acts. A stop $b^2$ limits the movement of the head carrying plate. A nut D is fixed on the hub B' of the head carrying plate by means of the set screw $d$. The lead screw E operates in this nut. It is secured to the arbor by means of the bolt E' which extends through the lead screw and is screwed in the opening $c$ in the well $c'$ in the arbor. The bolt E' has a square head $e$ and a cap E² secured to it which forms a means by which the screw may be manually operated without the use of a wrench. The lead screw E and the nut D are of course changed as it is desired to make threads of different pitches.

The chuck H is secured to the head C'. It is provided with the slots having the sides $h$ forming guides in which the devices or dies to be cut are placed. The cap screws $h'$ are passed through the openings $l$ in the devices and secured to the chuck. Slotted washers $h^2$ are provided. These may be readily removed as the screws are loosened so as to facilitate the removal of the devices or dies from the chuck. As shown, these devices have four cutting faces $i'$.

The head C' is driven by a worm gear F which is mounted on the head with a spline and groove so that it is locked against rotation on the head but is free to permit the head to move axially therein. The worm gear is driven by the worm G which is carried by the shaft G'. The shaft G' is carried by the journals $g$ and $g'$. The shaft is provided with the collars $g^2$ to lock it against axial movement. The bearing $g'$ has the pivotal connection $g^3$ with an upright $g^4$ on the slide B. The bearing $g$ has a pivotal connection $g^6$ with an upright $g^5$. The upright has the extension $g^7$ which projects through an opening $g^8$ in a post $g^9$ on the slide B. A latch $g^{10}$ normally locks the post $g^5$ in its lower position so that the worm is in mesh with the worm gear. The latch is carried by a slide $g^{11}$ sliding on the post $g^9$. The slide has the cam end $g^{13}$ which is in the path of a pin $g^{12}$ on the worm gear. A spring $g^{14}$ is tensioned against the upright $g^5$ and the block $a$, after the head has repeated a revolution, thus completing one set of dies, the pin $g^{12}$ acting on the cam $g^{13}$ moves the latch off from the finger $g^7$, thus releasing the upright $g^5$ and the spring $g^{14}$, then forces the upright $g^5$ upwardly as the upright moves the shaft G is swung on the pivot $g^8$, the pivot G⁶ permits this movement, thus carrying the worm gear out of mesh, thus stopping the machine. The milling cutter J has the cutting teeth $j$. There are a plurality of the teeth $j$ in an axial direction, so that the cutter is adapted to simultaneously form a plurality of threads on the die. As shown it is tapered and adapted to form a tapered die. It is rotatively mounted in the post K and is driven by pulley L. As the head is rotated the faces of the dies are brought into cutting relation with the cutter J and the dies are advanced to give the proper pitch to the thread by means of the lead screw E.

It is desirable to give to the dies some clearance and to accomplish this it is necessary to move the head transversely relatively to the cutter as it is advanced. We accomplish this as follows: A block $a^3$ is secured by a bolt $4^a$ on the arm $a^2$, the arm $a^2$ extending from the plate $a'$. The plate $a'$ is secured to the frame of the machine by the screws $5^a$. The inner surface of the block $a^3$ is eccentric to the axis of the die, the point $a^4$ being nearer the axis than the point $a^5$. The head is provided with similar blocks $m'$, one for each cutting face. As these blocks $m'$ move in contact with the surface of the block $a^3$ the cam surface of the block $a^3$ forces the head toward the left as shown in Fig. 1, so that the die being cut is forced toward the cutter as the cutter progresses, thus providing the desired clearance. The spring $b$ returns the head to position after the head has been rotated so as to cut one of the chasers and thus spring it into proper position to start a fresh cut on the next succeeding chaser when the operation is repeated. The blocks $m'$ are secured by the screws $m^2$ to the nuts $m$ arranged in a groove $m^3$ in a ring M. The blocks may, therefore, be changed so that blocks $m'$ may be secured which will conform to the surface of the block $a^3$. They may also be adjusted by loosening the screws $m^2$ and moving the nuts to the desired position. The ring M is fixed on the head. The gear F rolls in the worm G as the head is moved through the influence of the cam $a^3$. The rotation of the worm is such that this lateral movement has very little influence on the rotary feeding movement of the head.

Where a taper thread is desired and a taper cutter is used as shown, the cutting edges of the dies would not be in proper relation, or, in other words, approximately concentric if the head assumed exactly the same transverse position for cutting each chaser. It becomes necessary, therefore, to compensate for the difference in position brought about by the underwise movement of the head relatively to the taper cutter. To accomplish this we form the surface of the block $a^3$ on a taper having the same taper as the cutter J. This gives a slightly different transverse position to the head as it advances from one chaser to the other so as to exactly compensate for the taper of the cutter. The blocks $m'$ are preferably formed with the same taper as the taper on the block $a^3$ and both blocks $m'$ and the block $a^3$ are made removable so that blocks having the taper of the cutter may be used.

It is to be observed that with this construction a screw thread cutting device may be entirely completed with one revolution of the head and with the use of the milling cutter practically no loss is experienced by reason of the tearing of the metal so that a finely finished product may be rapidly made.

It will be observed that the cutter is of small diameter relatively to the die and it therefore enters and leaves the work abruptly, and where the axis of the cutter is parallel to the axis of the die this gives greater latitude to the shape of the threads in that the bevel of the thread in this short distance engaged by the cutter will, with a cutter of this small diameter, give sufficient clearance.

The use of a milling cutter having a plurality of teeth adapted to cut a plurality of threads is desirable, not only by reason of the added speed that it gives but by reason of the fact that the stock from which the device is being cut is cut down on adjacent threads simultaneously so that there is a very slight cut on both sides of the edges of the thread prior to its completion. Where a single cutter is used one thread being cut to its full depth the cut on adjacent thread is all from one side so that more or less care must be exercised in so handling the cut that it does not leave a ragged edge on the thread.

What we claim as new is:—

1. In a machine for forming screw thread cutting devices the combination of a rotating milling cutter having teeth for simultaneously cutting a plurality of threads arranged on a taper; means for rotating the cutter; a head for holding the device to be formed, said head holding the device in constant relation to the axis of the head; and means for bringing the cutter and device into cutting relation and relatively rotating and advancing them to complete the cut and for moving them transversely relatively to each other to compensate for the taper to be given to the device.

2. In a machine for forming screw thread cutting devices the combination of a rotating milling cutter having teeth for simultaneously cutting a plurality of threads arranged on a taper; means for rotating the cutter; a head for holding the device to be formed, said head holding the device in constant relation to the axis of the head and with its axis parallel to the axis of the cutter; and means for bringing the cutter and device into cutting relation and relatively rotating and advancing them to complete the cut and for moving them transversely relatively to each other to compensate for the taper to be given to the device.

3. In a machine for forming screw thread dies for cutting exterior screw threads, the combination of a head for holding the dies in constant relation with the axis of the head; a rotating milling cutter having teeth for simultaneously cutting a plurality of threads arranged on a taper; means for rotating the cutter and means for bringing the cutter and the interior surface of the work into cutting relation and relatively rotating and advancing them to complete the cut and for moving them transversely relatively to each other to compensate for the taper to be given to the device.

4. In a machine for forming screw thread dies for cutting exterior screw threads, the combination of a head for holding the dies in constant relation with the axis of the head; a rotating milling cutter having teeth for simultaneously cutting a plurality of threads arranged on a taper; means for rotating the cutter; and means for bringing the cutter and the interior surface of the work into cutting relation with their axes parallel, and relatively rotating and advancing them to complete the cut and for moving them transversely relatively to each other to compensate for the taper to be given to the device.

5. In a machine for forming screw thread cutting devices the combination of a rotating milling cutter having teeth for simultaneously cutting a plurality of threads arranged on a taper; means for rotating the cutter; a head for holding the device to be formed, said head being arranged to hold the device in constant relation with the axis of the head; a screw acting directly upon the head for rotatively advancing the device; and a cam acting directly upon the head for moving it transversely to compensate for the taper to be given the device.

6. In a machine for forming screw thread cutting devices the combination of a rotating milling cutter having teeth for simultaneously cutting a plurality of threads arranged on a taper; means for rotating the cutter; a head for holding the device to be formed and arranged with its axis parallel to the axis of the cutter, said head being arranged to hold the device in constant relation with the axis of the head; a screw acting directly on the head for rotatively advancing the device; and a cam acting directly on the head for moving it transversely to compensate for the taper to be given the device.

7. In a machine for forming screw thread cutting devices having a series of cutting faces the combination of a thread cutter; a head for holding the devices, said head being arranged to hold said devices in constant relation with the axis of the head; means for rotating the head; and a cam acting directly upon the head for moving it simultaneously transversely to cut away the device back of the cutting face for clearance.

8. In a machine for forming screw thread cutting devices the combination of a thread cutter having a plurality of teeth for simultaneously cutting a plurality of threads arranged on a taper; a head for holding the device, said head being arranged to hold said device in constant relation with the axis of the head; means for rotating the head; and a cam acting directly upon the head for simultaneously moving it transversely to compensate for the taper.

9. In a machine for forming screw thread cutting devices the combination of a thread cutter having a plurality of teeth for simultaneously cutting a plurality of threads arranged on a taper; a head for holding the device mounted to move transversely and axially, said head being arranged to hold said device in constant relation with the axis of the head; a screw for advancing the head for the pitch of the thread; a block carried by the head; a fixed block against which the block on the head contacts, one of said blocks having a tapered surface to give the head transverse movement as it is advanced for the pitch to compensate for the taper of the cutter.

10. In a machine for forming screw thread cutting devices the combination of a thread cutter having a plurality of teeth for simultaneously cutting a plurality of threads arranged on a taper; a head for holding the device mounted to move transversely and axially, said head being arranged to hold said device in constant relation with the axis of the head; a screw for advancing the head for the pitch of the thread; a block carried by the head; a fixed block against which the block on the head contacts, one of said blocks having a tapered surface to give the head transverse movement as it is advanced for the pitch to compensate for the taper of the cutter; and means for giving the head a further transverse movement as the cut advances for providing clearance from the cutting faces of the device.

11. In a machine for forming screw thread cutting devices the combination of a cutter fixed against axial movement; a longitudinally and transversely movable head for holding the device, said head being arranged to hold said device in constant relation with the axis of the head; means for rotating the head; a lead screw directly engaging the head for advancing the head as it is rotated; and a cam acting directly upon the head for moving it transversely as it is moved axially by the screw.

12. In a machine for forming screw thread cutting devices, the combination of a cutter fixed against axial movement; a longitudinally and transversely movable head for holding the device, said head being arranged to hold said device in constant relation with the axis of the head; means for rotating the head; a lead screw acting directly upon the head for advancing the head as it is rotated; and a taper block arranged in the path of the head for moving it transversely as it is moved axially by the screw.

13. In a machine for forming screw thread cutting devices the combination of a cutter fixed against axial movement; a longitudinally and transversely movable head for holding the device, said head being arranged to hold said device in constant relation with the axis of the head; means for rotating the head; a lead screw acting directly upon the head for advancing the head as it is rotated; and a removable tapered block arranged in the path of the head for moving it transversely as it is moved axially by the screw.

14. In a machine for forming screw thread cutting devices the combination of a cutter fixed against axial movement; a longitudinally and transversely movable head for holding the device slidingly mounted to move transversely, said head being arranged to hold said device in constant relation with the axis of the head; a screw for moving the head axially to give the pitch to the cut; means for rotating the head; the removable block $a^3$; and the removable blocks $m'$ arranged on the head in the path of the cam block $a^3$ for moving the head transversely.

15. In a machine for forming screw thread cutting devices the combination of the frame A having the cross pieces A', $A^2$; the head carrying plate B slidingly mounted in said cross pieces and having a hub B' and bearing therein; the arbor C journaled in said bearing; the nut D fixed on the hub B'; the lead screw E secured to the arbor and operated in the nut D; the head C' secured to the arbor; the blocks $m'$ removably secured to the head; the cam block $a^3$ secured by the frame and in the path of the block $m'$; the spring $b$ for forcing the head carrying plate in one direction; a chuck on the head; the cutter J; and means for rotating the cutter J.

16. In a machine for serrating the thread forming cutters of screw threading dies, the combination of a circular cutter formed with peripheral cutter blades and mounted to rotate in a stationary bearing, a stationary supporting base arranged in adjacent relation to said cutter, a work carrier mounted on said base and having rotary and rectilinear movements upon and along its axis of revolution, the axis of revolution of the cutter and carrier being in separated relation, and means for imparting movement to the carrier longitudinal to its axis and coequal to the pitch distance of the teeth to be cut in a full revolution of the carrier.

17. In a machine for serrating the thread forming cutter of screw threading dies, the combination of a circular cutter having a tapering periphery formed with peripheral cutter blades and mounted to rotate in a stationary bearing, a stationary supporting base arranged in adjacent relation to said cutter, a work carrier mounted on said base and having rotary and rectilinear movements upon and along its axis of revolution, the axis of revolution of the cutter and carrier being in separated relation, means for imparting lateral movement to the carrier coequal to the taper of the cutter, and means for imparting movement to the carrier longitudinal to its axis and coequal to the pitch distance of the teeth to be cut in a full revolution of the carrier.

18. In a machine for serrating the thread forming cutters of screw-threading dies, the combination of a circular cutter formed with peripheral cutter blades and mounted to rotate in a stationary bearing, a stationary supporting base arranged in adjacent relation to said cutter, a carriage slidingly mounted on said base, a work carrier mounted on said carriage and having rotary and rectilinear movements upon and along its axis of revolution, the axis of revolution of the cutter and carrier being in separated relation, means for imparting movement to the carrier longitudinal to its axis and coequal to the pitch distance of the teeth to be cut in a full revolution of the carrier, and a plurality of means for effecting a lateral reciprocation of the carrier during the operation of the machine, said plurality of means corresponding with the plurality of cutter blades in the die operated on and individual thereto.

19. In a machine for serrating the thread forming cutters of screw-threading dies, the combination of a circular cutter having a tapering periphery formed with peripheral cutter blades and mounted to rotate in a stationary bearing, a stationary supporting base arranged in adjacent relation to said cutter, a carriage slidingly mounted on said base, a work carrier mounted on said carriage and having rotary and rectilinear movements upon and along its axis of revolution, the axis of revolution of the cutter and carrier being in separated relation, means for imparting lateral movement to the carrier coequal to the taper of the cutter, means for imparting movement to the carrier longitudinal to its axis and coequal to the pitch distance of the teeth to be cut in a full revolution of the carrier, and a plurality of means for effecting a lateral reciprocation of the carrier during the operation of the machine, said plurality of means corresponding with the plurality of cutter blades in the die operated on and individual thereto.

20. In a mechanism for serrating the thread-forming cutters of screw-threading dies, the combination of a laterally movable supporting member or carriage, a revoluble work-carrier having a screw-threaded support upon said carriage, the threads of which support correspond in pitch to the teeth of the die to be cut, a rotary cutter operating on the die on the work-carrier, and cams coöperating with the revoluble work carrier to automatically move the same laterally at intervals during its revolution, substantially as and for the purpose described.

21. In a mechanism for serrating the thread-forming cutters of screw-threading dies, the combination of a laterally movable supporting member or carriage, a spring pressing the same in one direction, a revoluble work-carrier having a screw-threaded support upon said carriage, the threads of which support correspond in pitch with the teeth of the die to be cut, a rotary cutter operating on the die on the work-carrier and cams coöperating with the work-carrier to automatically move the same laterally, against the stress of the before-mentioned spring, at intervals in the revolution of the carrier.

In testimony whereof we have hereunto set our hands in the presence of two subscribing witnesses.

ROSS PIER WRIGHT.
FRANK W. HUBBARD.

Witnesses:
H. C. LORD,
K. R. KANE.